Oct. 23, 1934.  A. F. MASURY  1,977,731
HEAT EXCHANGE PLATE
Filed Jan. 6, 1933
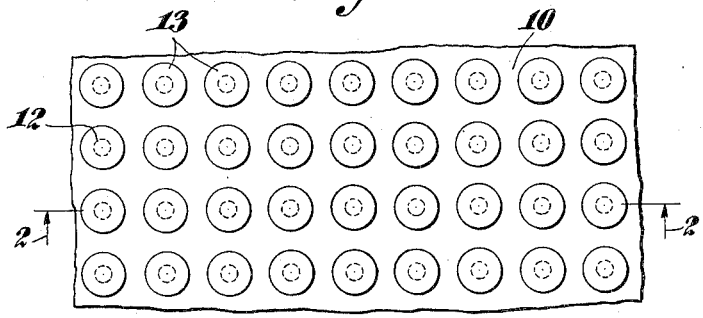
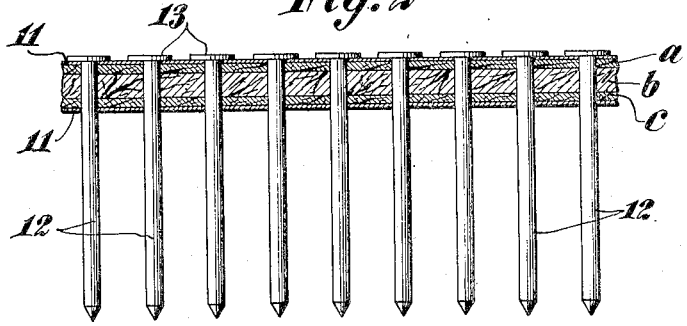
INVENTOR
Alfred F. Masury,
BY
Redding, Greeley, O'Shea & Campbell
HIS ATTORNEYS Patented Oct. 23, 1934

1,977,731

UNITED STATES PATENT OFFICE

1,977,731

HEAT EXCHANGE PLATE

Alfred F. Masury, New York, N. Y., assignor to International Motor Company, New York, N. Y., a corporation of Delaware Application January 6, 1933, Serial No. 650,439

1 Claim. (Cl. 257—263)

The present invention relates to heat exchange plates and embodies, more specifically, a heat exchange plate or element which is capable of transferring heat effectively from one fluid medium to another isolated medium, the plate being simple and inexpensive of construction.

In certain forms of refrigerating mechanisms, particularly those shown and described in the copending application of Edwin M. Post and George O. Hanshew, Ser. No. 627,310 filed August 3, 1932, assigned to the assignee of the present invention, a refrigerating medium, such as solid carbon dioxide is maintained in a compartment which is separate from the heat exchange and refrigerating compartments, the regulation of the temperature of the refrigerating compartment being effected by the control of air flow through the heat exchange compartment. In constructions of this character, therefore, it becomes particularly important to afford a heat exchange plate which effectively transfers heat from the heat exchange compartment to the compartment in which the refrigerant is contained.

In order that such interchange of heat between compartments may be effected, the present invention has been designed and an object thereof is to provide an element which may be inexpensively manufactured and which is highly effective in transferring heat from one side thereof to the other.

Further objects, not specifically enumerated above, will be apparent as the invention is described in greater detail in connection with the accompanying drawing, wherein:

Figure 1 is a plan view of a heat exchange plate constructed in accordance with the present invention.

Figure 2 is a view in section, taken on line 2—2 of Figure 1, and looking in the direction of the arrows.

With reference to the above drawing, supporting plate 10 is shown as being constructed of outer layers of metal 11 (Figure 2) and an inner layer of plywood, in the present instance having three plies a, b, and c. Inserted through the plate 10 are nails 12 having heads 13 which abut against one surface of the plate 10 and serve as a supporting means for the refrigerating element which is adapted to rest thereon. The heads 13, having an extended superficial area, serve as an effective means for transferring heat from the nails 12 to the refrigerant which rests upon the heads 13. The nails 12, being of solid unitary construction serve as an effective means for transferring heat between the region upon one side of the plate 10 to the other side.

Because the nails 12 afford a heat path which is not interrupted by joints or other abutting edges, the flow of heat takes place more effectively than in heat exchange elements now available. This heat flow through jointless elements as described above may take place in constructions varying somewhat from that shown specifically in Figures 1 and 2.

While the invention has been described with specific reference to the accompanying drawing, it is not to be limited, save as defined in the appended claim.

I claim as my invention:

A heat transfer device comprising metallic supporting plates spaced by a layer of ply wood, said plates having nails pressed therethrough with enlarged heads engaging one side thereof and extending therefrom at the other side.

ALFRED F. MASURY.